Patented May 7, 1929.

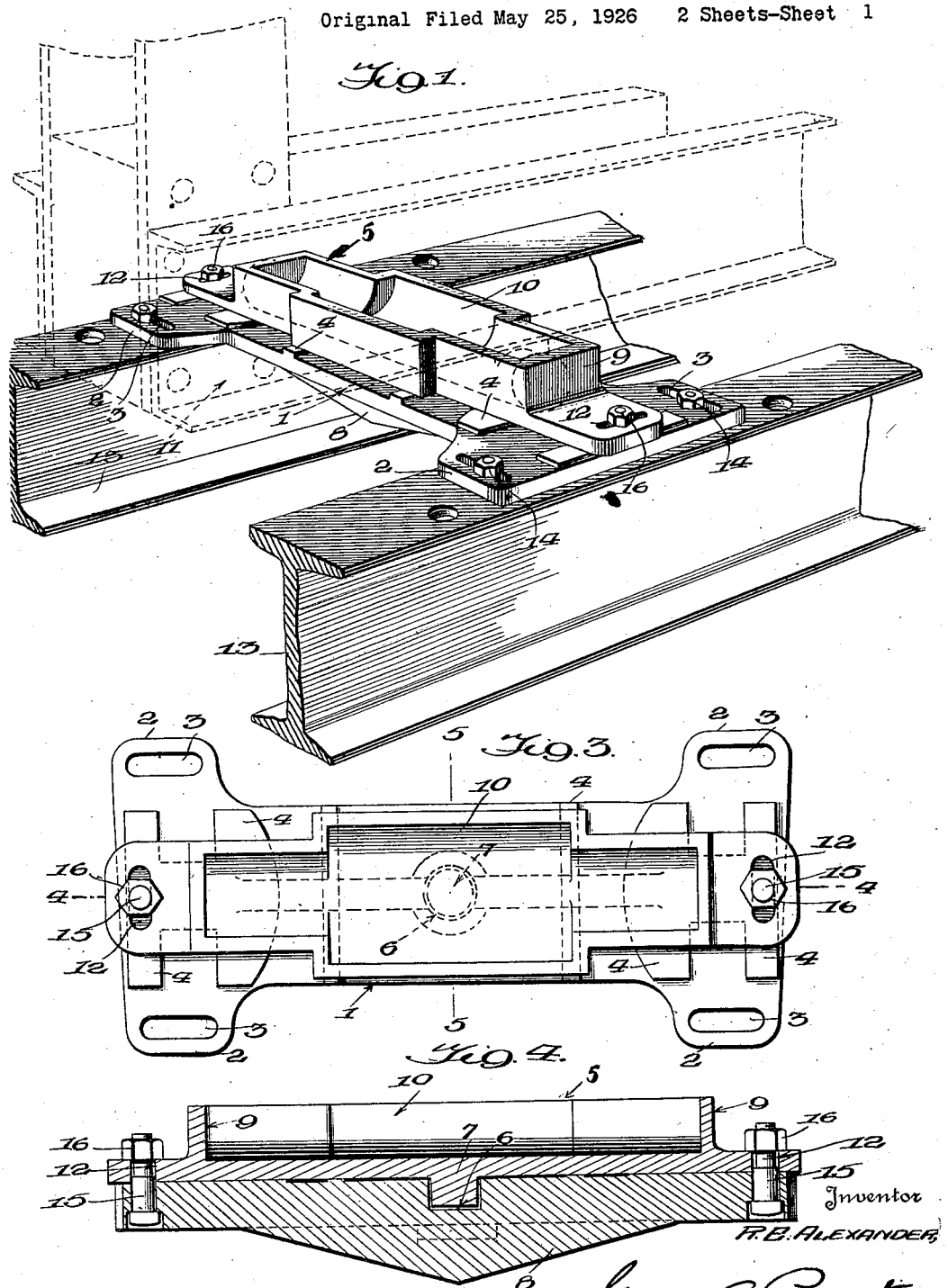

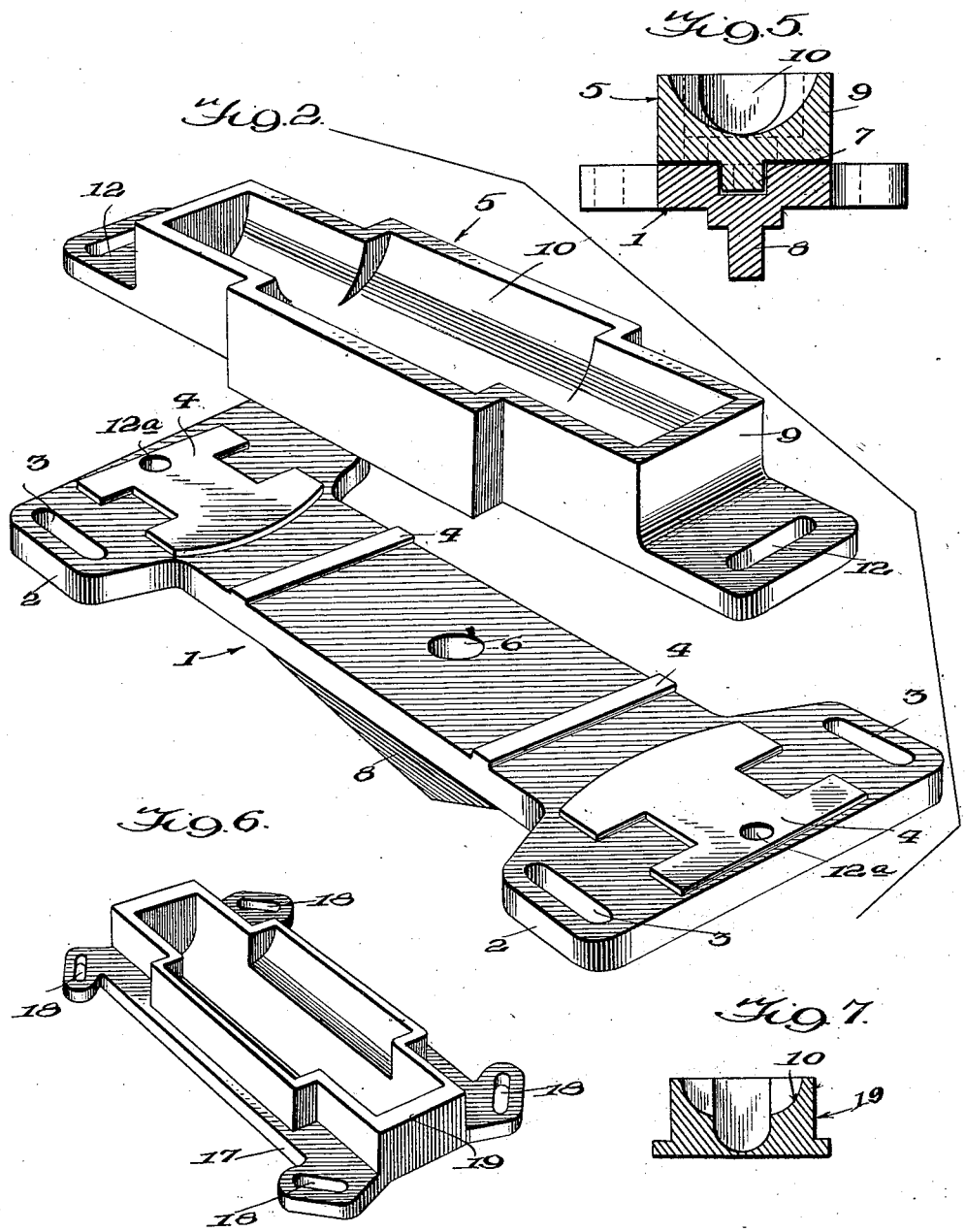

1,712,191

UNITED STATES PATENT OFFICE.

ROBERT E. ALEXANDER, OF TULSA, OKLAHOMA.

SELF-ADJUSTING BEARING PLATE FOR V'S.

Application filed May 25, 1926, Serial No. 111,546. Renewed December 6, 1928.

My invention consists in new and useful improvements in adjustable bearing plates to pivotally support the trunnions of a pumping V or jack on a supporting base.

Pumping jack castings are rough, seldom machined and often ill-fitting, in consequence of which, the jacks, when assembled are not always straight and true. Unless castings which meet to form bearings are so arranged that each may adjust itself with reference to the other, there will be caused strain and unequal wear, which will result in short life and broken parts.

The strain on the bearing plate is naturally greater than on any other part, due to the fact that it supports the V with the entire weight of the sucker rods and oil, often several tons, resting at the forward point, and the pull rods rocking the V rearwardly with a strain sufficient to lift this weight. Thus the V will naturally assume a straight line position between these two points of tension. The trunnions or gudgeons fixed to the lower part of the V should be at right angles to this straight line, for if it is not, the V will not ride correctly. But, whether it is or not, the bearing plate should be adjusted to it so that it may ride as freely as possible with a minimum of strain or unequal wear.

It is the object of my invention to provide a bearing plate which is self adjusting and which will obviate these disadvantages. My improved bearing plate may be used with any V type pumping jack having trunnions or gudgeons upon which it bears. It is particularly adapted for use on such a jack frame as is shown and described in my Letters Patent No. 1,466,573, August 28, 1923.

With the above and other objects in view, which will appear as the description proceeds, the invention consists in the novel features herein set forth, illustrated in the accompanying drawings and more particularly pointed out in the appended claims.

In the drawings, numerals of like character designate similar parts throughout the several views.

Fig. 1 is a perspective view showing a section of a pumping V of jack, and my improved bearing plate mounted on the base I beams, also shown in section.

Fig. 2 is an enlarged view showing the two separate parts of my device.

Fig. 3 is a plan view of the two parts assembled.

Fig. 4 is a section taken on line 4—4 of Fig. 3, showing the pivot member.

Fig. 5 is a section taken on line 5—5 of Fig. 3.

Fig. 6 is a perspective view of a modification of my invention, and

Fig. 7 is a cross sectional view thereof.

Referring to the drawings, 1 designates the base or support, preferably composed of iron or steel, and provided with longitudinally extending slots 3 near each end thereof, and an annular aperture $12^a$ near the longitudinal ends thereof. It is obvious that these slots 3 and the annular apertures $12^a$ may be of any number and placed in any suitable location. The particular form shown in the drawing discloses the base 1 as flaring into an enlarged portion 2 which shape is more convenient for use on the jack frame described in the patent heretofore mentioned, but the base may be made in any suitable form. 4 represents raised surfaces on the top of said base 1, upon which the upper bearing body is adapted to rest. The raised surfaces are not necessary as the operation would be the same if the surface was flat. In the central portion of said base I provide an aperture or recess 6 to receive a pivot pin in the body member 5. It is manifest that the same operation could be performed by reversing the pin and recess, or by making recesses in both the body member 5 and the base 1 and using a pin to fit into both recesses, and that the same result could be accomplished in other ways, such as using a recessed arc or circle in one member and a corresponding projection in the other member which would fit the recess. The under side of the base 1 is reinforced by a rib 8 cast or affixed integral therewith and extending longitudinally thereof, which performs no part of the operation but merely strengthens the base.

The bearing body 5 comprises a longitudinally extending box or seat 9 recessed as at 10 to fit and receive the trunnions of the pumping V 11. The under side of this bearing body 5 is provided with a pivot pin 7 as before mentioned, adapted to engage the recess 6 in the base 1, but other construction as above mentioned could be used for the same purpose. At each end of this body 5, I provide a laterally extending slot 12; either is shaped to allow the pivot motion, or large enough to permit the swing, and is adapted to register with the aperture $12^a$ in the base 1 as will be described later. The same result could necessarily be accomplished by one or more slots placed at any convenient position or positions, or by any other means, such as a clamp, to secure the position of the bearing body to the base.

The application of my device is as follows: The base 1 is secured to any suitable support which in the drawings appears as I-beams 13, as shown in Fig. 1, by the nuts and bolts 14, the slots 3 allowing the proper lateral adjustment of the I-beams. The bearing body 5 is then placed on the base 1 with the pivot pin 7 engaging the recess 6 in said base, the underside of said body resting upon the raised surfaces 4, and the slots 12 engaging bolts 15 extending upwardly from the apertures 12ª in said base 1. The nuts 16 are screwed loosely on the bolts 15 and the trunnions of the pumping jack or V placed in the bearing seat 10.

The pumping jack is put into operation and the base member adjusted by means of the longitudinal slots 3, so that the jack will be in a straight line position between the two points of tension and the base member 1 is then secured to the foundation. With the movement of the jack, the pivotally mounted bearing body 5 will automatically adjust itself to its proper position with relation to the trunnions of the pumping jack or V as heretofore explained. The bearing body 5 may then be left free to maintain this proper position and continue to automatically adjust itself with changed conditions such as may be caused by wear or use, in which event the bolts 15 and nuts 16 are unnecessary, or may be fixed in position by means of bolts 15 and nuts 16 (or other means of security), which may be loosened for re-adjustment at any time.

Another application of my device is as follows: The base member 1 may be dispensed with, and the bearing body 5 used independent thereof, by setting said bearing body upon a suitable foundation or base, such as concrete, in which anchor bolts have been placed to extend through the slots 12, and a recess, equivalent to the recess at 6, provided in the foundation to engage the pivot pin 7, the device may be operated in the same manner as above described, except that there will be no lateral adjustment of the jack, as is the case where the base 1 is used. It is equally true that the pivot pin may be placed in the foundation, and the recess made in the bearing body, or both foundation and bearing body made with recesses into which an independent pivot pin is inserted, performing the operation in substantially the same manner.

The device shown in Figs. 6 and 7 is a modification of the bearing body above described used without the base member, and is its equivalent in operation. This bearing is integral and comprises a bearing plate 17, provided with a plurality of slots 18 arranged around a common arc, the center of which is the center of the bearing. When anchor bolts are properly placed in these slots to secure the plate to the foundation, the plate will swing as freely as if turning on a pin. The box and bearing seat 19 are similar to those just described, with the exception that in the modification, the whole device is integral and receives its oscillation through the medium of the slots 18 rather than the pivot feature 6 and 7 of the other device.

From the foregoing it is believed that my invention may be clearly understood without further description, it being borne in mind that numerous changes may be made in the details of construction without departing from the spirit of the invention as disclosed in the appended claims.

What I claim and desire to secure by Letters Patent is:—

1. A bearing support for pumping jacks for use in pumping oil wells, comprising a supporting plate adapted to be secured to a suitable foundation and provided with a central recess, means whereby said plate may be adjusted laterally on said foundation, an adjustable bearing plate recessed on its upper side to receive the gudgeon of a pumping jack and provided with a central pivot pin on its under side, said pin being adapted to engage said recess in the supporting plate, whereby said bearing plate is pivotally mounted thereon, said bearing plate being provided at its longitudinal extremities with slots adapted to engage bolts on said supporting plate, whereby said bearing plate is adapted to be oscillated through a predetermined arc by the jack in aligning itself, and means for securing said bearing plate in place when the proper position is obtained.

2. A bearing support for pumping jacks for use in pumping oil wells, comprising a supporting plate adapted to be secured to a suitable foundation, an adjustable bearing plate recessed on its upper side to receive the gudgeon of a pumping jack, one of said plates being provided with a central recess adapted to receive a centrally located pivot pin on the other plate, raised bearing surfaces on one of said plates adapted to engage the adjacent surface of the other plate, and means whereby said bearing plate is permitted to oscillate through a predetermined arc, and for securing the same in place when the proper position is obtained.

3. In a jack frame for oil wells as claimed in claim 1, said means for laterally adjusting the supporting plate comprising slots in said supporting plate adapted to receive bolts secured in the said foundation.

4. A bearing support for pumping jacks for use in pumping oil wells, comprising a supporting plate adapted to be secured to a suitable foundation, and provided with a central pivot receiving part, an adjustable bearing plate recessed on its upper side to receive the gudgeon of a pumping jack, and provided with a central pivot member adapted to engage the pivot receiving part on the supporting plate, whereby said bearing plate is pivotally mounted thereon, one of said members being provided at its longitudinal extremities with slots adapted to engage bolts on the adjacent member, whereby said bearing plate is adapted to be oscillated through a predetermined arc by the jack in aligning itself, and means for securing said bearing plate in place when the proper position is obtained.

5. A bearing support for pumping jacks for use in pumping oil wells, comprising a supporting plate adapted to be secured to a suitable foundation, and provided with a central pivot receiving part, means whereby said plate may be adjusted laterally on said foundation, an adjustable bearing plate recessed on its upper side to receive the gudgeon of a pumping jack, and provided with a central pivot member adapted to engage the pivot receiving part on the supporting plate, whereby said bearing plate is pivotally mounted thereon, one of said members being provided at its longitudinal extremities with slots adapted to engage bolts on the adjacent member, whereby said bearing plate is adapted to be oscillated through a predetermined arc by the jack in aligning itself, and means for securing said bearing plate in place when the proper position is obtained.

In testimony whereof I affix my signature.

ROBERT E. ALEXANDER.